United States Patent [19]
Tuttle

[11] Patent Number: 5,662,718
[45] Date of Patent: Sep. 2, 1997

[54] METHOD OF FORMING THIN PROFILE BATTERIES AND A THIN PROFILE BATTERY INSULATING AND SEALING GASKET

[75] Inventor: Mark E. Tuttle, Boise, Id.

[73] Assignee: Micron Communications, Inc., Boise, Id.

[21] Appl. No.: 649,925

[22] Filed: May 16, 1996

Related U.S. Application Data

[63] Continuation of Ser. No. 348,543, Dec. 1, 1994, abandoned.

[51] Int. Cl.$^6$ .................................................. H01M 10/12
[52] U.S. Cl. ................................... 29/623.1; 429/171
[58] Field of Search .................................... 429/127, 174, 429/175, 176, 171, 172, 173; 29/623.1

[56] References Cited

U.S. PATENT DOCUMENTS

| | | | |
|---|---|---|---|
| 3,741,812 | 6/1973 | Spellman et al. | 136/107 |
| 4,256,815 | 3/1981 | Smilanich et al. | 429/185 |
| 4,333,995 | 6/1982 | Ishida et al. | 429/172 |
| 4,457,990 | 7/1984 | Tucholski | 429/162 |
| 4,656,104 | 4/1987 | Tucholski | 429/185 |
| 5,432,027 | 7/1995 | Tuttle et al. | 429/127 |
| 5,486,431 | 1/1996 | Tuttle et al. | 429/66 |
| 5,494,495 | 2/1996 | Tuttle | 429/623.2 |

FOREIGN PATENT DOCUMENTS

| | | |
|---|---|---|
| 0 089 496 | 2/1983 | European Pat. Off. |
| 0 089 495 | 2/1983 | European Pat. Off. |
| 0009056 | 1/1982 | Japan. |
| 59-8262A | 1/1984 | Japan. |
| 61-163559A | 7/1986 | Japan. |

*Primary Examiner*—M. Nuzzolillo
*Attorney, Agent, or Firm*—Wells, St. John, Roberts, Gregory & Matkin, P.S.

[57] ABSTRACT

A method of forming a button-type battery includes: a) positioning first and second terminal housing members in facing juxtaposition to one another, and providing an anode, a cathode and an electrolyte intermediate the first and second terminal housing member central portions; b) providing a peripheral insulative sealing gasket intermediate the first and second terminal housing members, the insulative sealing gasket being in the shape of an annulus and having a radial extent which extends radially outward beyond the surrounding peripheral portions of the first and second terminal housing members; c) moving at least one of the juxtaposed first and second terminal housing members in the direction of the other to push the first terminal housing member container wall against the first gasket face and to simultaneously force the second terminal housing member peripheral portion against the second gasket face, and continuing such moving to bend the insulative gasket about the container wall and force it to be received within the first terminal housing member; and d) after the moving step, crimping the container wall and sealing gasket against the peripheral portion of the second terminal housing member to form an enclosed housing. An alternate method includes: i) providing a discrete, pre-formed peripheral insulative sealing gasket in the shape of an annulus; and ii) positioning the discrete, pre-formed sealing gasket within the first terminal housing member, then crimping to seal. A novel gasket construction is also disclosed.

19 Claims, 9 Drawing Sheets

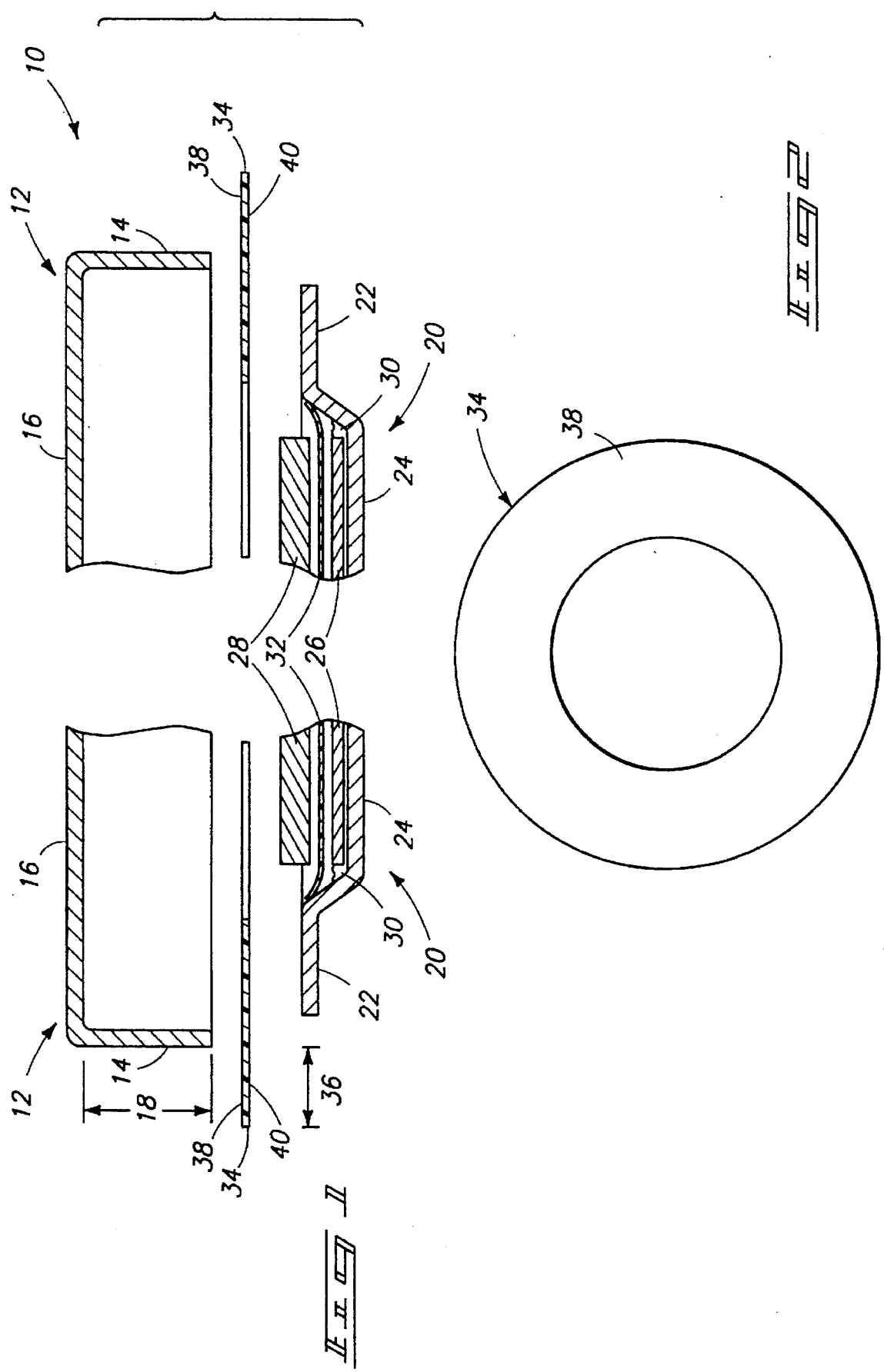

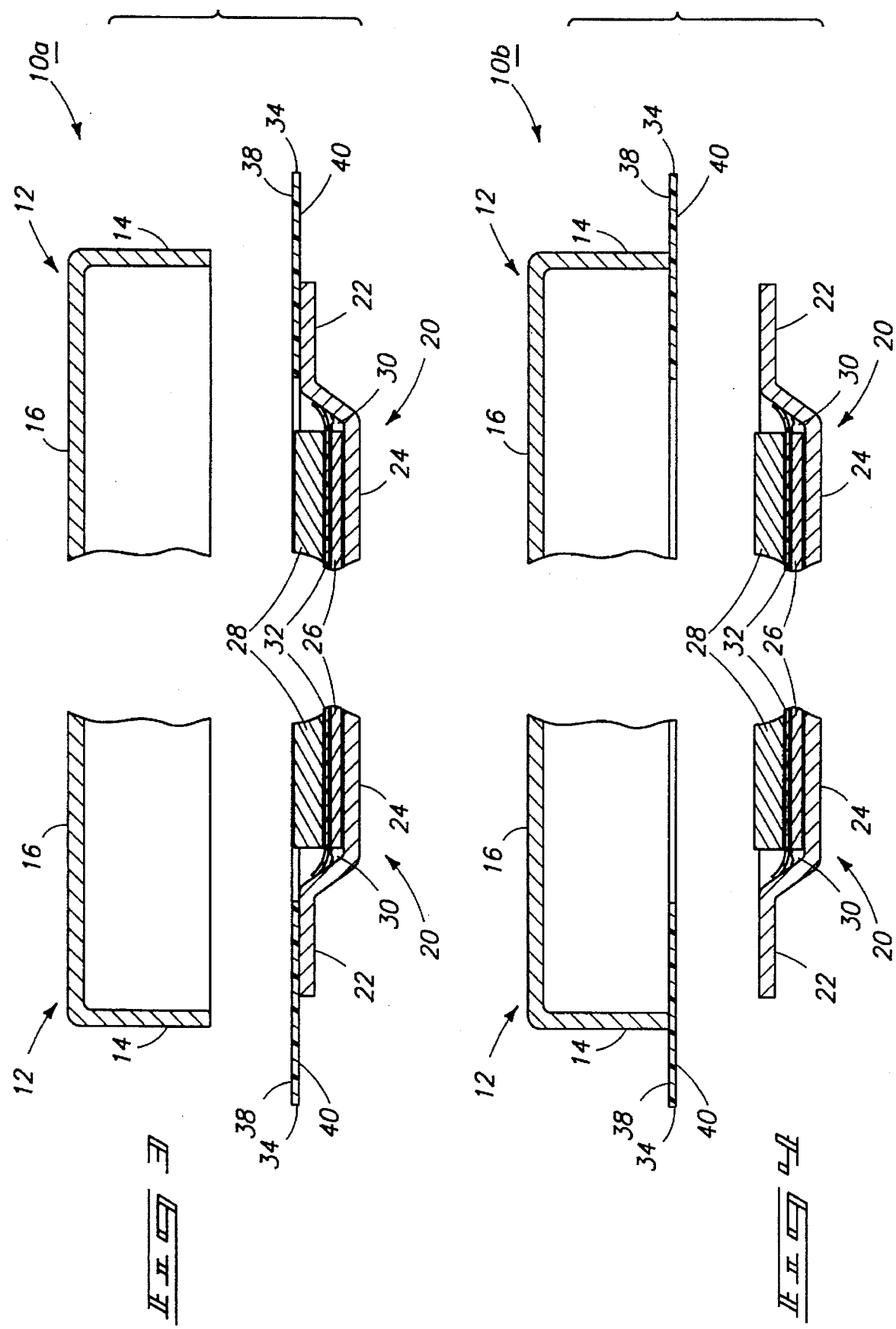

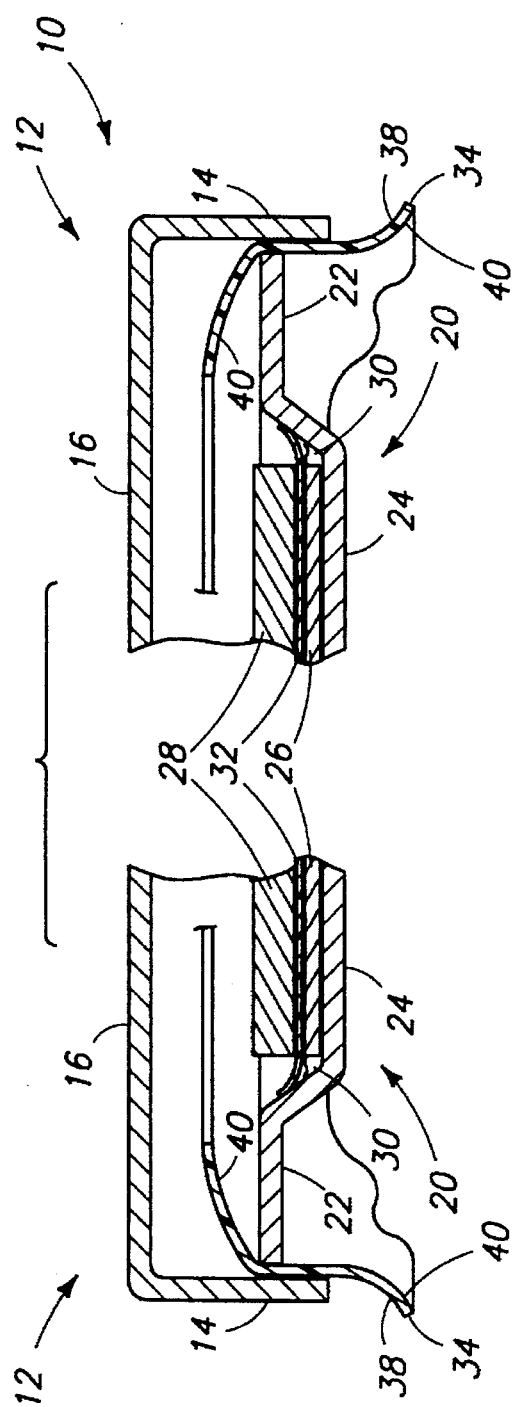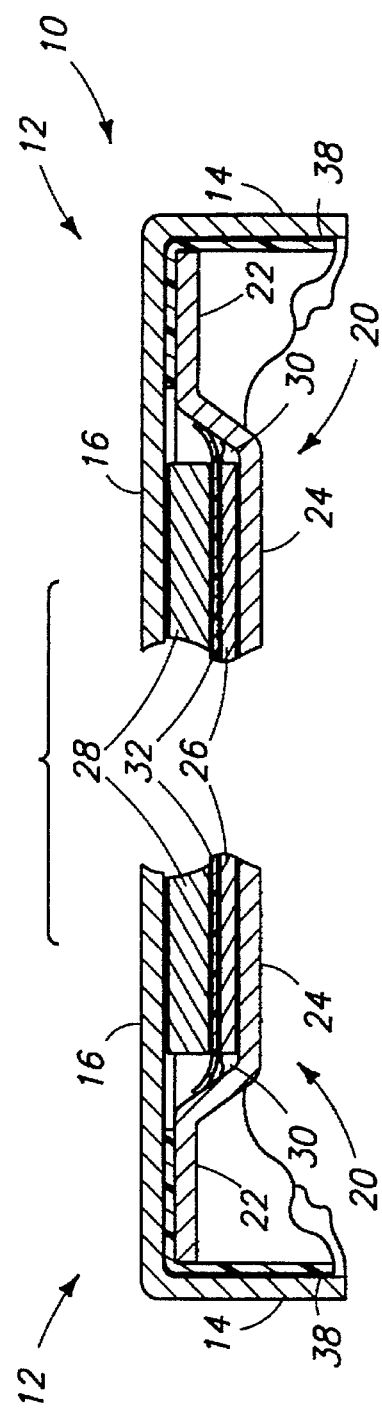

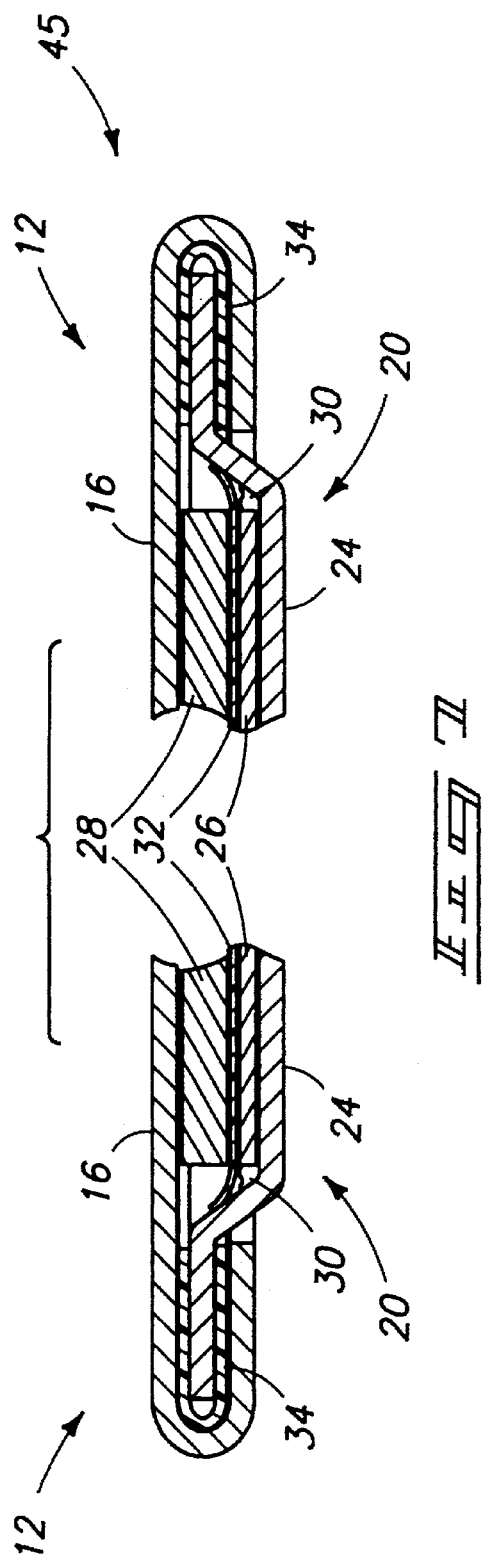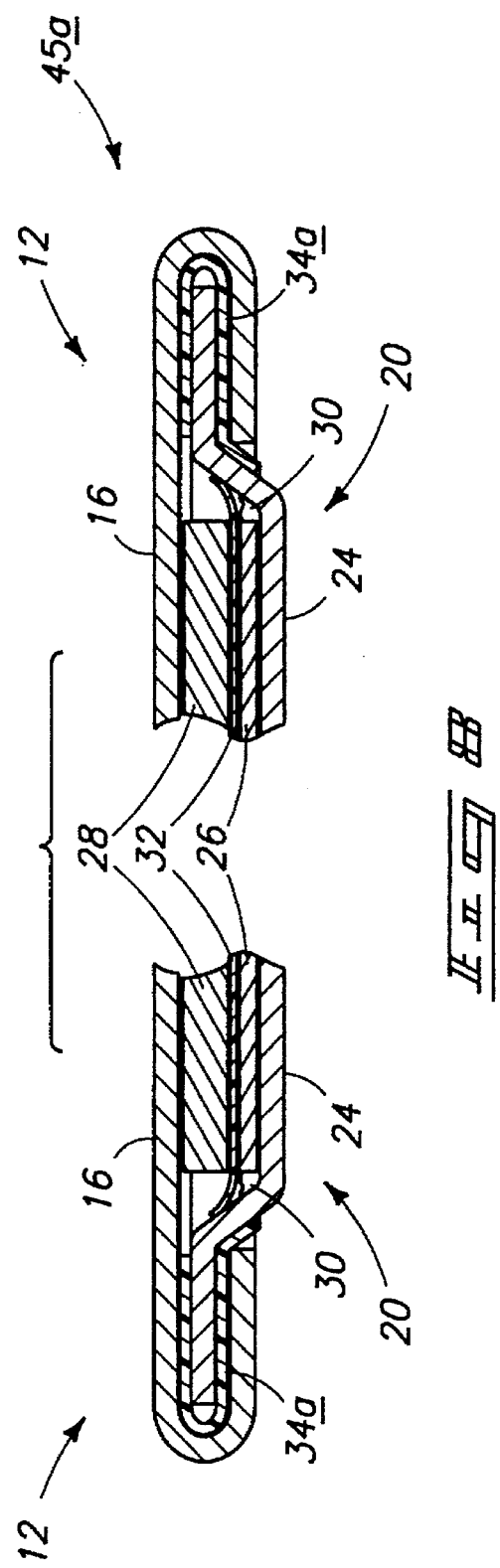

5,662,718

METHOD OF FORMING THIN PROFILE BATTERIES AND A THIN PROFILE BATTERY INSULATING AND SEALING GASKET

RELATED PATENT DATA

This patent resulted from a file wrapper continuation application under 37 CFR § 1.62 of prior application Ser. No. 08/348,543 filed on Dec. 1, 1994, entitled "Method of Forming Button-Type Batteries And A Button-Type Battery Insulating And Sealing Gasket", by the following named inventor: Mark E. Tuttle.

TECHNICAL FIELD

This invention relates to methods of forming button-type batteries and to button-type battery insulating and sealing gaskets.

BACKGROUND OF THE INVENTION

Button-type batteries are small, thin energy cells that are commonly used in watches and other electronic devices requiring a thin profile. A conventional button-type battery includes two electrodes in the form of an anode and a cathode. These are typically separated by a porous separator. An electrolyte is present within pores of the separator.

These internal battery components are housed within a metal casing or housing formed by a lower conductive can and an upper conductive lid. A common prior art material for the can and lid is stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically isolate the two housing members.

This invention principally concerns the provision of the sealing gasket material within the crimp.

BRIEF DESCRIPTION OF THE DRAWINGS

Preferred embodiments of the invention are described below with reference to the following accompanying drawings.

FIG. 1 is an exploded fragmentary cross-sectional view of button-type battery components illustrative of a method of forming a button-type battery in accordance with an aspect of the invention.

FIG. 2 is a top view of a gasket component of FIG. 1.

FIG. 3 is a fragmentary sectional view of button-type battery components in position in a method of forming a button-type battery in accordance with the invention.

FIG. 4 is a fragmentary sectional view of button-type battery components in position in an alternate method of forming a button-type battery in accordance with the invention.

FIG. 5 is a fragmentary sectional view of button-type battery components in process during a method of forming a button-type battery in accordance with the invention.

FIG. 6 is a view of the FIG. 5 battery components at a point in time subsequent to the processing step illustrated by FIG. 5.

FIG. 7 is a view of the FIG. 5 battery components at a point in time subsequent to the processing step illustrated by FIG. 6.

FIG. 8 is a sectional view of a button-type battery produced in accordance with a method of the invention, and differs from the FIG. 7 construction in utilization of an alternate sized sealing gasket.

DETAILED DESCRIPTION OF THE PREFERRED EMBODIMENTS

Figure 9:
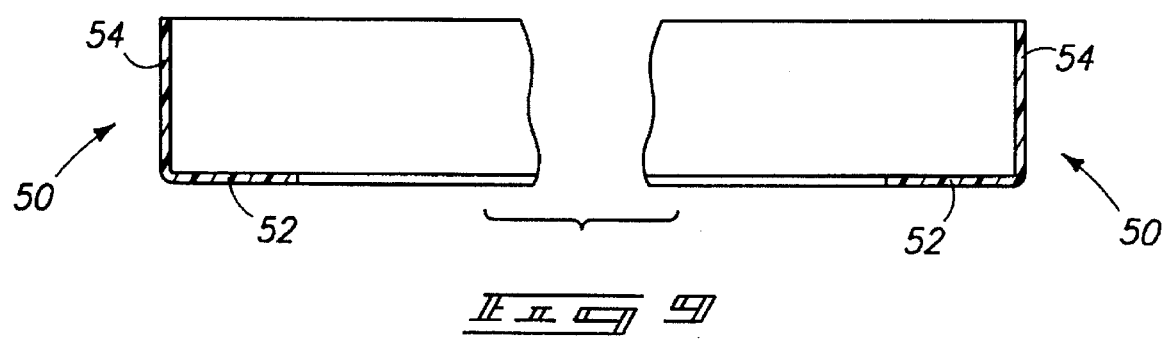
FIG. 9 is a fragmentary side sectional view of a discrete, pre-formed peripheral insulating sealing gasket utilized in an alternate method of forming a button-type battery in accordance with another aspect of the invention.
Figure 10:
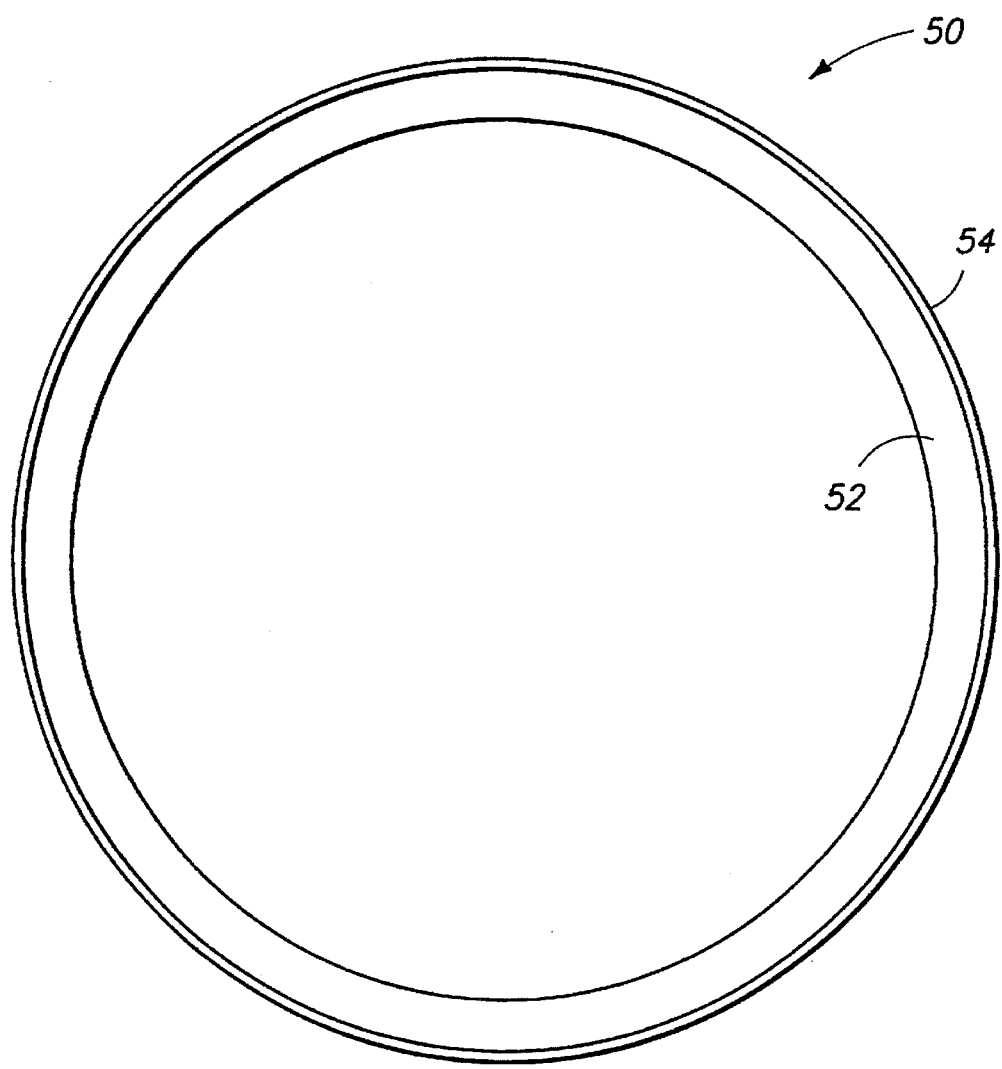
FIG. 10 is reduced scale top view of the FIG. 9 sealing gasket.
Figure 11:
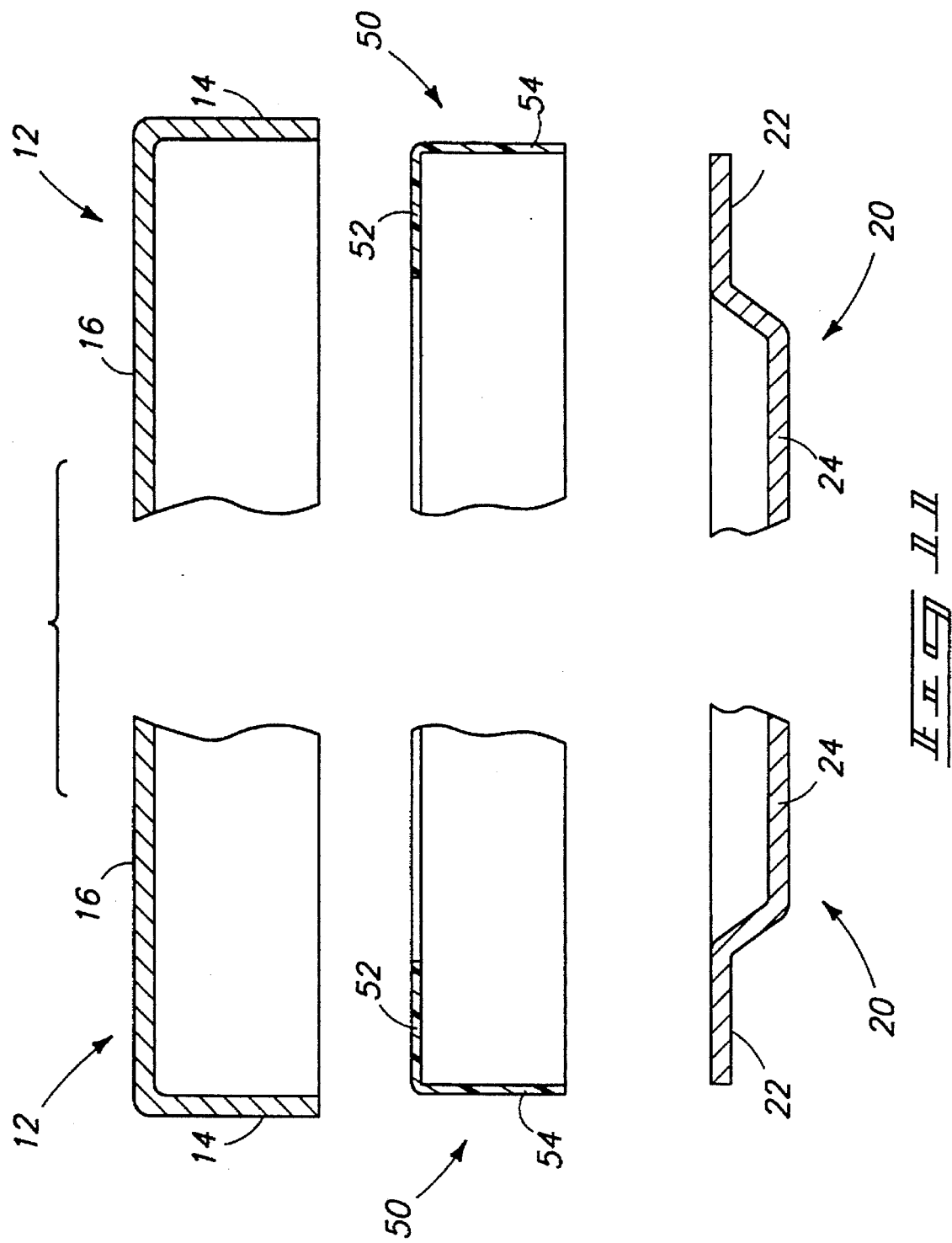
FIG. 11 is a fragmentary exploded view of button-type battery components, including the gasket of FIGS. 9 and 10, positioned for assembly in accordance with an aspect of the invention.

This disclosure of the invention is submitted in furtherance of the constitutional purposes of the U.S. Patent Laws "to promote the progress of science and useful arts" (Article 1, Section 8).

In accordance with a first aspect of the invention, a method of forming a button-type battery comprises the following steps:

providing a conductive first terminal housing member having a surrounding peripheral portion and a central portion intermediate the surrounding peripheral portion, the surrounding peripheral portion comprising a transversely projecting peripheral container wall;

providing a conductive second terminal housing member having a surrounding peripheral portion and a central portion intermediate its surrounding peripheral portion;

positioning the second terminal housing member and the first terminal housing member in facing juxtaposition to one another, and providing an anode, a cathode and an electrolyte intermediate the first and second terminal housing member central portions;

providing a peripheral insulative sealing gasket intermediate the first and second terminal housing members, the insulative sealing gasket being in the shape of an annulus and having a radial extent which extends radially outward beyond the surrounding peripheral portions of the first and second terminal housing members, the insulative sealing gasket having opposing first and second faces, the first face facing the first terminal housing member, the second face facing the second terminal housing member;

moving at least one of the juxtaposed first and second terminal housing members in the direction of the other to push the first terminal housing member container wall against the first gasket face and to simultaneously force the second terminal housing member peripheral portion against the second gasket face, and continuing such moving to bend the insulative gasket about the container wall and force it to be received within the first terminal housing member; and after the moving step, crimping the container wall and sealing gasket against the peripheral portion of the second terminal housing member to form an enclosed housing which retains and protects the anode, cathode and electrolyte; the insulative gasket insulatingly sealing between the crimped container wall and the second terminal housing member peripheral portion.

In accordance with another aspect of the invention, a method of forming a button-type battery comprises the following steps:

providing a conductive first terminal housing member having a surrounding peripheral portion and a central portion intermediate the surrounding peripheral portion, the surrounding peripheral portion comprising a transversely projecting peripheral container wall;

providing a conductive second terminal housing member having a surrounding peripheral portion and a central portion intermediate its surrounding peripheral portion;

providing a discrete, pre-formed peripheral insulative sealing gasket, the gasket being in the shape of an annulus and comprising at least in part a substantially annular "L" cross sectional shape defining an annular "L" base portion and an annular "L" stem portion;

positioning the discrete, pre-formed sealing gasket within the first terminal housing member with the "L" stem portion extending internally along the container peripheral wall;

positioning the second terminal housing member and the first terminal housing member in facing juxtaposition to one another, and providing an anode, a cathode and an electrolyte intermediate the first and second terminal housing member central portions, the second terminal housing member peripheral portion being received against the "L" base portion of the positioned sealing gasket; and crimping the container wall and sealing gasket against the peripheral portion of the second terminal housing member to form an enclosed housing which retains and protects the anode, cathode and electrolyte; the insulative gasket insulatingly sealing between the crimped container wall and the second terminal housing member peripheral portion.

In accordance with still a further aspect of the invention, a button-type battery insulative sealing gasket comprises:

an annular body at least a portion of which has a substantially "L" cross sectional shape;

the "L" cross sectional shape defining an annular "L" base portion, the "L" base portion being configured to receive an inner sealing portion of a peripheral portion of a button-type battery terminal lid, the "L" base portion having a radial length and an inner radial portion and an outer radial portion;

the "L" cross sectional shape defining an annular "L" stem portion, the "L" stem portion being configured to receive an outer sealing portion of a peripheral portion of a button-type battery terminal lid, the "L" stem portion having a transverse length and an inner transverse portion and an outer transverse portion; and the "L" base portion having a thickness which varies along its radial length, the base thickness being greater at the inner radial portion than at the outer radial portion.

More particularly and first with reference to FIGS. 1 and 2, button-type battery components for assembly are indicated generally with reference numeral 10. Such are comprised of a first terminal housing member 12 having a surrounding peripheral portion 14 and a central portion 16 intermediate surrounding peripheral portion 14. Portion 14 is in the form of a substantially normal peripheral container wall which projects transversely relative to central portion 16. In the illustrated embodiment, container wall 14 projects to a first distance 18 relative to central portion 16. An example first distance 18 would be 0.033 inches.

The button-type battery components also include a second terminal housing member 20 having a surrounding peripheral portion 22 and a central portion 24 intermediate peripheral portion 22. Conventionally in the art, first terminal housing member 12 is commonly referred to as a "container" or "can", while second terminal housing member 20 is typically referred to as a "lid". Second terminal housing member 20 and first terminal housing member 12 are positioned in opposing facing juxtaposition to one another. An anode 26, a cathode 28 and liquid electrolyte 30 are provided intermediate first and second terminal housing member central portions 16 and 24, respectively. A porous separator 32 is also typically provided intermediate cathode 28 and anode 26. Components 26, 28, 30 and 32 could be provided either within first terminal housing member 12 or second terminal housing member 20, with positioning relative to second terminal housing member 20 being shown and preferred.

A peripheral sealing gasket 34 is provided intermediate first terminal housing member 12 and second terminal housing member 20. Gasket 34 is in the shape of an annulus, and has a radial extent 36 which extends radially outward beyond surrounding peripheral portions 14 and 22, as shown. Radial extent 36 defines a second distance which is less than first distance 18. Gasket 34 has opposing first and second faces 38, 40, respectively, with first face 38 facing first terminal housing member 12 and second face 40 facing second terminal housing member 20. Gasket 34 is of constant thickness (FIG. 1) and has a constant outer radius (FIG. 2).

Preferred techniques for providing and positioning the gasket intermediate the housing members are described with reference to FIGS. 3 and 4. In one embodiment 10a shown in FIG. 3, gasket second face 40 is adhered against second terminal housing member peripheral portion 22 prior to the step of positioning the first and second terminal housing members in juxtaposition to one another. An example and preferred adhesive is a tacky asphalt, such as Pioneer 760™ made by Pioneer Asphalt Company of Lawrenceville, Ill. In an alternate embodiment 10b as shown in FIG. 4, gasket first face 38 is placed against container wall 14 prior to the step of positioning the first and second terminal members in juxtaposition to one another. Again, preferably an adhesive such as the above Pioneer 760™ is used intermediate gasket first face 38 and container wall 14 for temporarily retaining gasket 34 in the illustrated position. The adhesive should not, however, be so strong as to prevent subsequent breaking and sliding of gasket 34 relative to walls 14, as will be apparent from the continuing discussion. Preferably, the anode, the cathode, the electrolyte, and the separator are positioned relative to one of the first or second housing members before the step of providing gasket 34 in its intermediate position.

Referring to FIGS. 5–7, at least one of juxtaposed first terminal housing member 12 or second terminal housing member 20 is moved in the direction of the other to push first terminal housing member peripheral wall 14 against first gasket face 38 and to simultaneously force second terminal housing member peripheral portion 22 against second gasket face 40. This will cause sliding movement of first gasket face 38 relative to the outer edge of container wall 14, as well as bending of gasket 34 (FIG. 5). Such movement is continued to bend insulative gasket 34 about container wall 14 and force gasket 34 to be received within first terminal housing member 12 (FIG. 6). After such bending and placement of gasket 34 within first container 12, container wall 14 and adjoining sealing gasket material 34 are crimped against peripheral portion 22 of second terminal housing member 20 (FIG. 7) to form an enclosed housing which retains and protects the anode, cathode and electrolyte. Insulative gasket 34 insulatingly seals between crimped container wall 14 and second terminal housing member peripheral portion 22. FIG. 7 illustrates a finished construction designated with numeral 45.

Referring to FIGS. 1 and 7, second distance 36 is preferably gauged to be less than first distance 18 such that upon finished folding and crimping, the outer terminus of gasket 34 aligns with the outer terminus of crimped container wall 14. Due to container wall 14 being bent about an effective larger radius than gasket 34, second distance 36 will be less than first distance 18 to accomplish such objective.

FIG. 8 illustrates an alternate embodiment 45a whereby second distance 36 is greater than or equal to first distance 18. As shown, gasket 34a has an outer terminus which projects outwardly beyond the terminus of container wall 14 after crimping. Such would provide an advantage of positioning insulative material between can 12 and lid 20 in this region. In either embodiment if desired, gasket 34 can be constructed to extend radially inward to contact the outer radial edge of cathode 28, thereby providing an alignment function within the housing relative for cathode 28.

A method of forming a button-type battery as described above enables the gasket to be made from extremely thin sheet stock, and minimizes final battery thickness. Preferred thickness is from 2 to 4 mils. Polypropylene is a preferred material which can be formed by cold pressing or hot pressing. Current button-type battery gaskets in industry are formed by injection molding, and are difficult to produce in desired shapes at thicknesses less than 7 mils.

An alternate embodiment and method of construction are described with reference to FIGS. 9–13. For simplification and ease of discussion, no anode, cathode, or electrolyte are shown with respect to the construction. Like numerals from the first-described embodiments are utilized where appropriate, with differences of construction being indicated with different numerals. An insulative sealing gasket 50 is provided as a discrete, pre-formed mass in the shape of an annulus. Such comprises at least in part a substantially annular "L" cross-sectional shape, defining an annular "L" base portion 52 and an annular "L" stem portion 54.

Figures 12, 13:
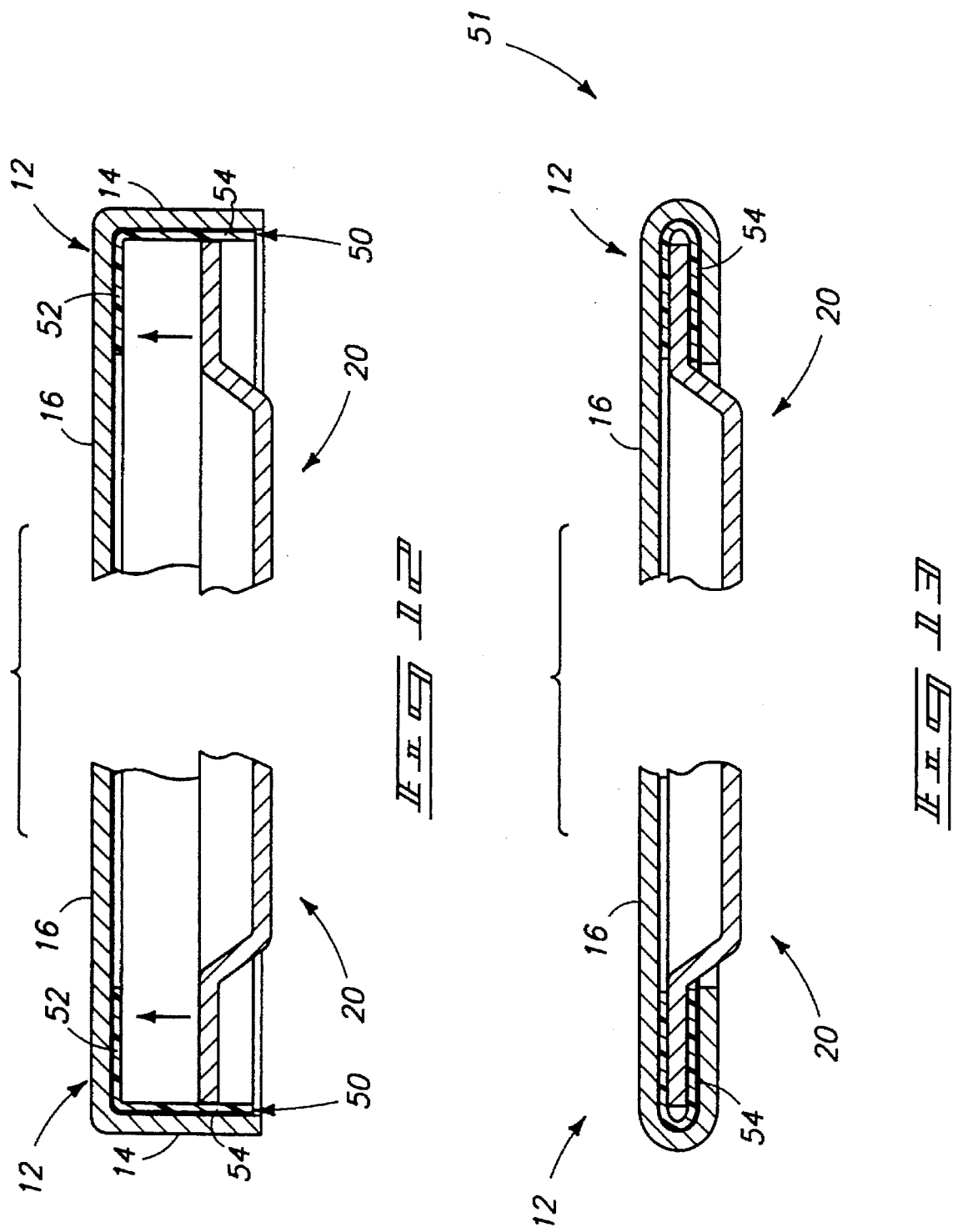
FIG. 12 is a side sectional view of the components of FIG. 11 shown in process during a method of forming a button-type battery in accordance with an aspect of the invention.
FIG. 13 is a fragmentary sectional view of button-type battery components of FIG. 11 shown in a finished assembled state.

Referring to FIG. 12, discrete pre-formed sealing gasket 50 is positioned within first terminal housing member 12 with "L" stem portion 54 extending internally along container peripheral wall 14. Preferably, gasket base 52 is adhered by a tacky adhesive to first terminal housing member 12, with the Pioneer 760™ being an example. Second terminal housing member 20 is moved into facing juxtaposition against "L" base portion 52 of sealing gasket 50.

Referring to FIG. 13, container wall 14 and gasket stem 54 are crimped against peripheral portion 22 of second terminal housing member 20 to form an enclosing housing which retains and protects the anode, cathode and the electrolyte (not shown). The finished construction is indicated with numeral 51. A preferred material of construction is polypropylene having from 1% to 3% ethylene.

Figure 14:
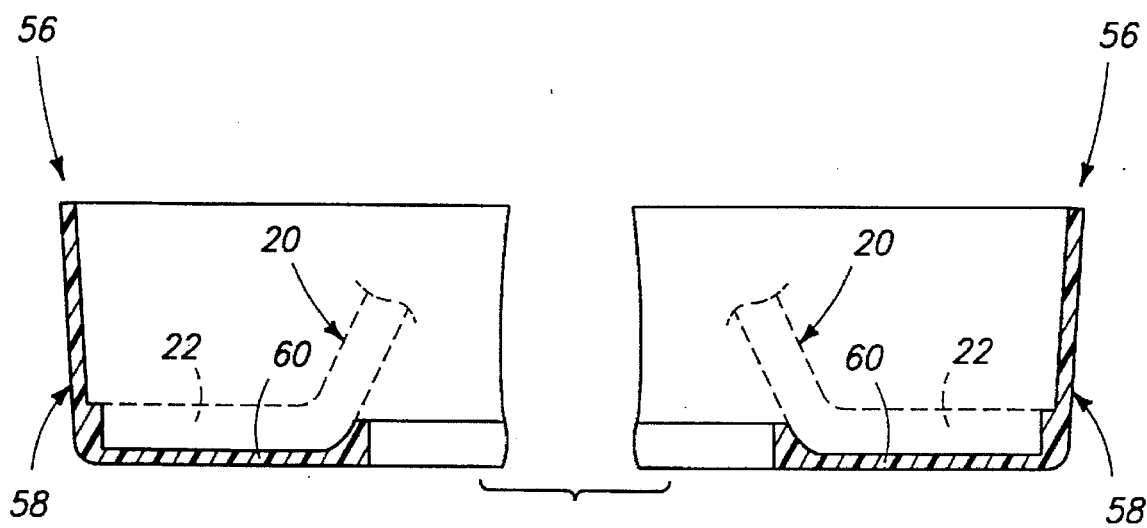
FIG. 14 is a side sectional view of a button-type battery insulative sealing gasket in accordance with the invention.
Figure 15:
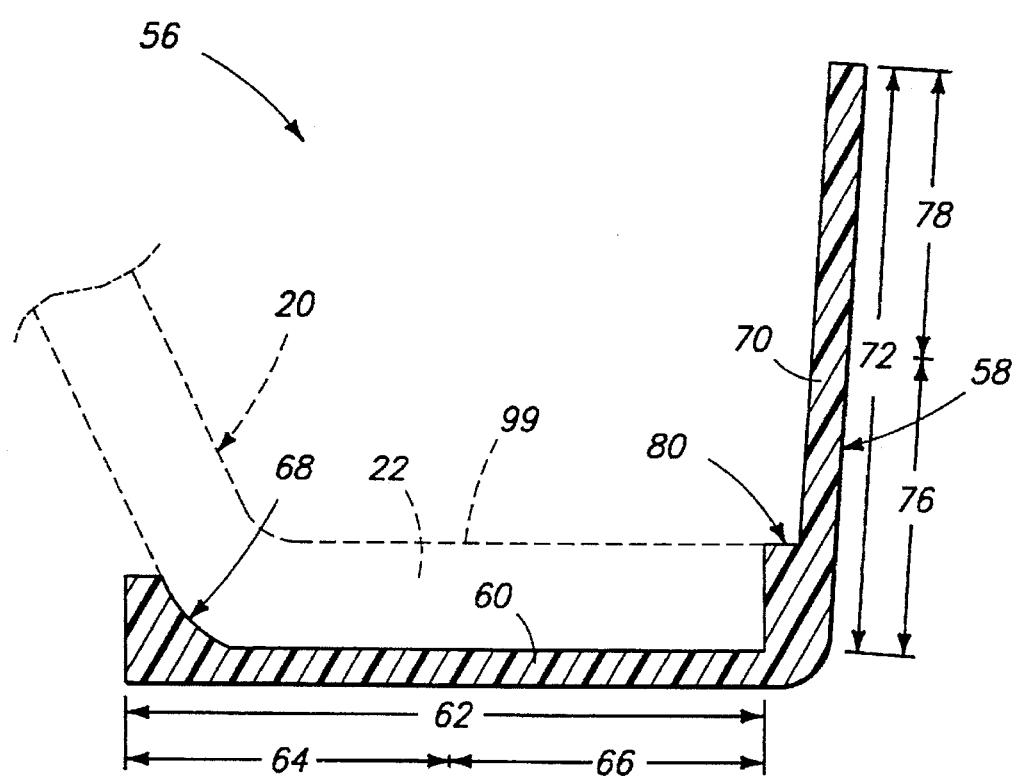
FIG. 15 is an enlarged view of a portion of the button-type battery insulative sealing gasket of FIG. 14.
Figure 16:
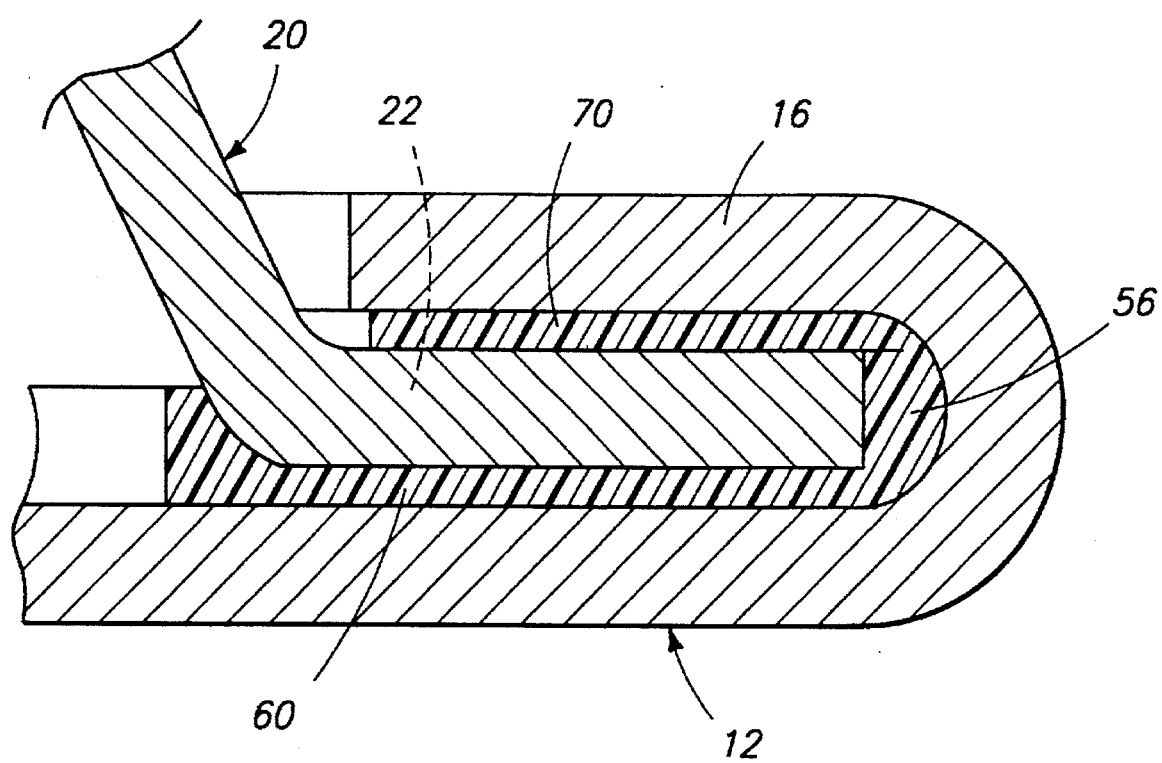
FIG. 16 is a view of the FIG. 14 gasket at the FIG. 15 scale, and illustrates the gasket in a sealed or crimped relationship with respect to first and second button-type battery terminal housing members.

In accordance with another aspect of the invention, a preferred embodiment button-type battery insulative sealing gasket is indicated generally with reference numeral 56 in FIGS. 14–16. Such is comprised of an annular body 58 having a substantially "L" cross-sectional shape. The "L" cross-sectional shape defines an annular "L" base portion 60 and an annular "L" stem portion 70. Base portion 60 is configured to receive an inner sealing portion of a peripheral portion 22 of a button-type battery terminal lid 20 for which the gasket is principally adapted. "L" base portion 60 has a radial length 62 (FIG. 15) and, for purposes of discussion, has an inner radial portion 64 and an outer radial portion 66.

Base portion 60 has a thickness which varies along its radial length 62, being greater at inner radial portion 64 than at outer radial portion 66. The illustrated change in the base portion thickness preferably occurs along a base are 68 which is sized and shaped to mate with a correspondingly shaped are of peripheral portion 22 of button-type a battery terminal lid 20 for which gasket 56 is adapted.

Stem portion 70 is configured to receive an outer sealing portion or surface 99 (FIG. 15) of peripheral portion 22 of button-type battery terminal lid 20. Stem portion 70 has a transverse length 72 which, for purposes of the continuing discussion, defines an inner transverse portion 76 and an outer transverse portion 78. "L" stem portion 70 also has a thickness which varies along its transverse length 72, with the stem thickness being greater at inner transverse portion 76 than at outer transverse portion 78. The thickness change for stem portion 70 occurs at a substantially perpendicular step 80, as opposed to along an arc as occurs in the base portion. Stem portion 70 angles from base portion 60 at slightly greater than 90°. This makes it easier to insert gasket 56 into the can and prevent stem portion 70 from folding inward and interfering with lid insertion.

Referring to FIG. 16, the components are positioned and crimped as shown to produce a peripheral seal for a button-type battery. Such a gasket construction provides two advantages. First, the greater mass of material defined at the gasket fold by step 80 substantially completely fills any outer void between lid 20 and can 12. Second, the enlarged inner radial portion of base 60 defined by arc 68 can be utilized to engage the outer radial edge of the cathode (not shown) to provide an alignment function with the battery to such cathode.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of forming a thin profile battery defined by a thickness which is less than a maximum linear dimension of its anode, comprising the following steps:

providing a conductive first terminal housing member having a surrounding peripheral portion and a central portion intermediate the surrounding peripheral portion, the surrounding peripheral portion comprising a transversely projecting peripheral container wall;

providing a conductive second terminal housing member having a surrounding peripheral portion and a central portion intermediate its surrounding peripheral portion;

positioning the second terminal housing member and the first terminal housing member in facing juxtaposition to one another, and providing an anode, a cathode and an electrolyte intermediate the first and second terminal housing member central portions;

providing a peripheral insulative sealing gasket in an intermediate position between the first and second terminal housing members, the insulative sealing gasket being in the shape of an annulus and having a radial extent which extends radially outward beyond the surrounding peripheral portions of the first and second terminal housing members, the insulative sealing gasket having opposing first and second faces, the first face facing the first terminal housing member, the second face facing the second terminal housing member;

moving at least one of the juxtaposed first and second terminal housing members in the direction of the other to push the first terminal housing member container wall against the first gasket face and to simultaneously force the second terminal housing member peripheral portion against the second gasket face, and continuing such moving to bend the insulative gasket about the container wall and force it to be received within the first terminal housing member; and after the moving step, crimping the container wall and sealing gasket against the peripheral portion of the second terminal housing member to form an enclosed housing which retains and protects the anode, cathode and electrolyte; the insulative gasket insulatingly sealing between the crimped container wall and the second terminal housing member peripheral portion.

2. The method of forming a thin profile battery of claim 1 wherein the annulus has a constant thickness and a constant outer radius.

3. The method of forming a thin profile battery of claim 1 wherein the container wall projects transversely relative to the first terminal housing member central portion to a first distance, and the annulus in intermediate position projects radially outward relative to the container wall to a second distance, the second distance being less than the first distance.

4. The method of forming a thin profile battery of claim 1 wherein the container wall projects transversely relative to the first terminal housing member central portion to a first distance, and the annulus in intermediate position projects radially outward relative to the container wall to a second distance, the second distance being greater than or equal to the first distance.

5. The method of forming a thin profile battery of claim 1 wherein, the annulus has a constant thickness and a constant outer radius; and the container wall projects transversely relative to the first terminal housing member central portion to a first distance, and the annulus in intermediate position projects radially outward relative to the container wall to a second distance, the second distance being less than the first distance.

6. The method of forming a thin profile battery of claim 1 wherein, the annulus has a constant thickness and a constant outer radius; and the container wall projects transversely relative to the first terminal housing member central portion to a first distance, and the annulus in intermediate position projects radially outward relative to the container wall to a second distance, the second distance being greater than or equal to the first distance.

7. The method of forming a thin profile battery of claim 1 wherein the anode, the cathode and the electrolyte are positioned relative to one of the first or second housing members before the step of providing the gasket in intermediate position.

8. The method of forming a thin profile battery of claim 1 wherein the step of providing the gasket comprises placing the gasket first face against the container wall prior to the step of positioning the first and second terminal housing members in juxtaposition to one another.

9. The method of forming a thin profile battery of claim 8 further comprising providing a tack adhesive intermediate the gasket first face and container wall.

10. The method of forming a thin profile battery of claim 1 wherein the step of providing the gasket comprises adhering the gasket second face against the second terminal housing member peripheral portion prior to the step of positioning the first and second terminal housing members in juxtaposition to one another.

11. The method of forming a thin profile battery of claim 1 wherein, the container wall projects transversely relative to the first terminal housing member central portion to a first distance, and the annulus in intermediate position projects radially outward relative to the container wall to a second distance, the second distance being less than the first distance; and the step of providing the gasket comprises placing the gasket first face against the container wall prior to the step of positioning the first and second terminal housing members in juxtaposition to one another.

12. The method of forming a thin profile battery of claim 1 wherein, the container wall projects transversely relative to the first terminal housing member central portion to a first distance, and the annulus in intermediate position projects radially outward relative to the container wall to a second distance, the second distance being greater than or equal to the first distance; and the step of providing the gasket comprises placing the gasket first face against the container wall prior to the step of positioning the first and second terminal housing members in juxtaposition to one another.

13. The method of forming a thin profile battery of claim 1 wherein, the container wall projects transversely relative to the first terminal housing member central portion to a first distance, and the annulus in intermediate position projects radially outward relative to the container wall to a second distance, the second distance being less than the first distance; and the step of providing the gasket comprises adhering the gasket second face against the second terminal housing member peripheral portion prior to the step of positioning the first and second terminal housing members in juxtaposition to one another.

14. The method of forming a thin profile battery of claim 1 wherein, the container wall projects transversely relative to the first terminal housing member central portion to a first distance, and the annulus in intermediate position projects radially outward relative to the container wall to a second distance, the second distance being greater than or equal to the first distance; and the step of providing the gasket comprises adhering the gasket second face against the second terminal housing member peripheral portion prior to the step of positioning the first and second terminal housing members in juxtaposition to one another.

15. A method of forming a thin profile battery defined by a thickness which is less than a maximum linear dimension of its anode, comprising the following steps:

providing a conductive first terminal housing member having a surrounding peripheral portion;

providing a conductive second terminal housing member having a surrounding peripheral portion;

positioning the second terminal housing member and the first terminal housing member in facing juxtaposition to one another and providing a gasket in an intermediate position between the first and second terminal housing members, the gasket being in the shape of an annulus and having a radial extent which extends outwardly beyond the surrounding peripheral portions of the first and second terminal housing members; and moving at least one of the juxtaposed first and second terminal housing members in the direction of the other to force the gasket to be received within the first terminal housing member and to bend the gasket.

16. The method of claim 15 further comprising crimping the first terminal housing member peripheral portion and gasket against the peripheral portion of the second terminal housing member to form an enclosed housing.

17. The method of claim 16 further comprising the provision of an anode, a cathode and an electrolyte, wherein the crimping step forms an enclosed housing which retains and protects the anode, cathode and electrolyte.

18. A method of forming a thin profile battery defined by a thickness which is less than a maximum linear dimension of its anode, comprising the following steps:

providing a conductive first terminal housing member having a surrounding peripheral portion;

providing a conductive second terminal housing member having a surrounding peripheral portion;

positioning the second terminal housing member and the first terminal housing member in facing juxtaposition to one another and providing a gasket in an intermediate position between the first and second terminal housing members, the gasket being circular and having a radial extent which extends outwardly beyond the surrounding peripheral portions of the first and second terminal housing members; and moving at least one of the juxtaposed first and second terminal housing members in the direction of the other to force the gasket to be received within the first terminal housing member and to bend the gasket.

19. A method of forming a thin profile battery defined by a thickness which is less than a maximum linear dimension of its anode, comprising the following steps:

providing a conductive first terminal housing member having a surrounding peripheral portion which comprises a transversely projecting peripheral container wall;

providing a conductive second terminal housing member having a surrounding peripheral portion;

providing a gasket, the gasket being in the shape of an annulus and comprising at least in part a substantially annular "L" cross sectional shape defining an annular "L" base portion, an annular "L" stem portion, and a step along the stem portion; the step comprising an upper surface which is substantially perpendicular to a lateral surface of the stem portion; the stem portion comprising an above-step section elevationally above the step;

after providing the gasket, positioning the gasket within the first terminal housing member with the "L" stem portion extending internally along the peripheral container wall, positioning the second terminal housing member and the first terminal housing member in facing juxtaposition to one another with the second terminal housing member peripheral portion being received against the "L" base portion of the gasket, and crimping the first terminal housing member peripheral container wall and sealing gasket against the peripheral portion of the second terminal housing member to form an enclosed housing; and wherein the crimping folds the above-step section of the stem portion over and against the upper surface of the step.

* * * * *

UNITED STATES PATENT AND TRADEMARK OFFICE
CERTIFICATE OF CORRECTION

PATENT NO. : 5,662,718

DATED : September 2, 1997

INVENTOR(S) : Mark E. Tuttle

It is certified that error appears in the above-identified patent and that said Letters Patent is hereby corrected as shown below:

Col. 6, ln. 18: Replace "are" with --arc--.

Col. 6, ln. 20: Replace "are" with --arc--.

Signed and Sealed this

Seventeenth Day of March, 1998

Attest:

BRUCE LEHMAN

Attesting Officer

Commissioner of Patents and Trademarks